US010318533B2

(12) United States Patent
Lafuente Alvarez et al.

(10) Patent No.: US 10,318,533 B2
(45) Date of Patent: Jun. 11, 2019

(54) OPTIMIZED QUERY EXECUTION IN A DISTRIBUTED DATA STREAM PROCESSING ENVIRONMENT

(71) Applicant: Telefonaktiebolaget LM Ericsson (publ), Stockholm (SE)

(72) Inventors: Luis Maria Lafuente Alvarez, Madrid (ES); David Manzano Macho, Madrid (ES)

(73) Assignee: Telefonaktiebolaget LM Ericsson (Publ) (SE)

( * ) Notice: Subject to any disclaimer, the term of this patent is extended or adjusted under 35 U.S.C. 154(b) by 746 days.

(21) Appl. No.: 14/761,452

(22) PCT Filed: Feb. 15, 2013

(86) PCT No.: PCT/EP2013/053082
§ 371 (c)(1),
(2) Date: Jul. 16, 2015

(87) PCT Pub. No.: WO2014/124686
PCT Pub. Date: Aug. 21, 2014

(65) Prior Publication Data
US 2016/0004751 A1 Jan. 7, 2016

(51) Int. Cl.
*G06N 5/04* (2006.01)
*H04L 29/08* (2006.01)
(Continued)

(52) U.S. Cl.
CPC .. *G06F 16/24568* (2019.01); *G06F 16/24542* (2019.01); *G06N 5/04* (2013.01); *H04L 67/10* (2013.01)

(58) Field of Classification Search
CPC ........ G06F 17/30516; G06F 17/30463; G06N 5/04; H04L 67/10
(Continued)

(56) References Cited

U.S. PATENT DOCUMENTS

2010/0030896 A1 2/2010 Chandramouli et al.
2011/0016160 A1* 1/2011 Zhang ............... G06F 17/30386
707/805

OTHER PUBLICATIONS

C. Basaran, K. Kang, Y. Zhou, M. Suzer, "Adaptive Load Shedding via Fuzzy Control in Data Stream Management Systems", SOCA, 5th IEEE International Conference, pp. 1-8, Dec. 2012. DOI: http://dx.doi.org/10.1109/SOCA.2012.6449438.*

(Continued)

*Primary Examiner* — Pierre M Vital
*Assistant Examiner* — Alicia M Antoine
(74) *Attorney, Agent, or Firm* — Christopher & Weisberg, P.A.

(57) ABSTRACT

A controller for controlling the processing of a data stream by a data stream processing system having a plurality of data stream management systems, DSMSs. Each DSMS is arranged to execute a respective continuous query to generate an output data stream having continuous query execution results. The controller controls the execution of the continuous query on a windowed portion of a data stream when different DSMSs receive different parts of the data for the windowed portion. The controller selects, for processing of the windowed portion of the data stream, a single DSMS that is to execute the respective continuous query. The controller generates a control signal to cause only the selected DSMS to execute the continuous query using data in the data stream received thereby, so that the continuous query is executed on data in the windowed portion of the data stream only by the selected DSMS.

18 Claims, 14 Drawing Sheets

(51) Int. Cl.
  *G06F 16/2453* (2019.01)
  *G06F 16/2455* (2019.01)
(58) Field of Classification Search
  USPC .......................................................... 707/718
  See application file for complete search history.

(56) References Cited

OTHER PUBLICATIONS

M. Couceiro, D. Suarez, D. Manzano, and L. Lafuente. Data stream processing on real-time mobile advertisement: Ericsson research approach. In Mobile Data Management (MDM), 2011 12th IEEE International Conference on, vol. 1, pp. 313-320. IEEE.*

Lauterwald, Frank ; Pollner, Niko ; Daum, Michael ; Meyer-Wegener, Klaus: Demo: Data Stream Application Manager (DSAM). In: ACM (Hrsg.) : Proc. 6th ACM Int. Conf. on Distributed Event-Based Systems (DEBS, Berlin, Jul. 16-Jul. 20, 2012). 2012, S. 381-382.—ISBN 978-1-4503-1315-5.*

Weihan Wang , Mohamed A. Sharaf , Shimin Guo , M. Tamer Özsu, Potential-driven load distribution for distributed data stream processing, Proceedings of the 2nd international workshop on Scalable stream processing system, Mar. 29-29, 2008, Nantes, France [doi>10.1145/1379272.1379277] (Year: 2008).*

International Search Report and Written Opinion dated Sep. 6, 2013 for International Application Serial No. PCT/EP2013/053082, International Filing Date—Feb. 15, 2013 consisting of 10-pages.

Frank Lauterwald et al.: "Demo: Data Stream Application Manager (DSAM)", Friedrich-Alexander University of Erlangen-Nuremberg, pp. 381-382, XP55077022, Erlangen-Nuremberg, Germany, Jul. 20, 2012 (Jul. 20, 2012), consisting of 2-pages.

Krasimira Kapitanova et al.: "Applying Formal Methods to Modeling and Analysis of Real-time Data Streams", Journal of Computing Science and Engineering, vol. 5(1):85-110, XP55077012, ISSN: 1976-4677, DOI: 10.5626/JCSE.2011.5.1.085 Mar. 31, 2011 (Mar. 31, 2011), consisting of 26-pages.

Krasimira Kapitanova et al.: "Modeling and Analyzing Real-Time Data Streams", Object/Component/Service-Oriented Real-Time Districted Computing (ISORC), 2011 14th IEEE International Symposium, IEEE, pp. 91-98, XP031943739, DOI: 10.1109/ISORC.2011.21 ISBN: 978-1-61284-433-6, Mar. 28, 2011 (Mar. 28, 2011), consisting of 8-pages.

Sharma Chakravarthy and Qingchun Jiang , Stream Data Processing: a Quality of Service Perspective. Springer. Advances in Database Systems, Editors: Ahmed K. Elmagarmid and Amit P. Sheth, vol. 36, ISBN: 978-0-387-71002-0 ;e-ISBN: 978-0-387-71003-7, consisting of 340-pages.

* cited by examiner

OPTIMIZED QUERY EXECUTION IN A DISTRIBUTED DATA STREAM PROCESSING ENVIRONMENT

TECHNICAL FIELD

The present disclosure generally relates to the field of data stream management systems and more specifically to techniques for improving the efficiency of a data stream processing system comprising a plurality of data stream management systems.

BACKGROUND

Traditional relational database management systems (DBMSs) have been researched for over thirty years and are used for a wide range of applications. One of their key features is the storage of data as a collection of persistent "relations", often referred to as tables. A relation is defined as a set of tuples that have the same attributes, each tuple comprising an ordered set of one or more data elements. In a DBMS, a table for relation) is organised into rows and columns. Each row of the table represents a tuple and each column represents an attribute common to all tuples (rows).

Another key feature of a DBMS is a set of well-defined operations (or "queries") that can be issued by any DBMS client in order to read, write, delete or modify the stored data. Structured Query Language (SQL) is the most widespread query language for this purpose, although it is often enriched with proprietary add-ons.

The conventional DBMS is also characterised by having highly optimised query processing and transaction management components, as illustrated in FIG. 1. A query from a DBMS client 1 is received by the DBMS 2, parsed by a query parsing unit 3 of the DBMS, and analysed in order to verify that it is both syntactically and semantically correct. Once this is done, a query plan is generated by the DBMS's query planner 4. A query plan is a set of step-by-step instructions defining how the query is to be executed, whose details depend on how the concrete DBMS is implemented. The query plan aims to optimise, for example, the number of accesses to the physical storage device 5 (e.g. a hard disk) in order to speed up the execution time.

Queries that are processed by a traditional DBMS are termed "ad hoc" queries. That is, the query is sent to the DBMS and the response to that query, which is both valid at that specific moment and complete, is sent back. Traditional (ad hoc) queries are typically specified in a particular format, optimised, and evaluated once over a "snapshot" of a database; in other words, over a static view of the data in the database. The stored data which is to be operated on during processing of the query must be stable, i.e. not subject to any other ongoing database transaction since, for example, a high ratio of write queries can harm the performance of the DBMS serving read queries.

However, in recent years, there has emerged another class of data intensive applications (such as those intended for sensor data processing, network management in telecommunications networks and stock trading) that need to process data at a very high input rate. Moreover, these applications need to process data that is typically received continuously over long periods of time in the form of a data stream, for example to identify interesting changes or patterns in a timely manner. These applications typically differ from traditional DBMS applications with respect to data arrival rates, update frequency, processing requirements, Quality of Service (QoS) needs, and notification support.

In principle, stream data could be processed by a traditional database management system, by loading incoming stream data into persistent relations and repeatedly executing the same ad hoc queries over these relations. However, there are several problems with this approach. Firstly, the storage of stream data, indexing (as needed) and querying would add considerable delay (or latency) in response time, which may not be acceptable to many stream-based applications. At the core of this mismatch is the requirement that data needs to be persisted on a secondary storage device 5, such as a hard disk typically having a high storage capacity and high latency, before it can be accessed and processed by a DBMS 2 implemented in main memory, such as a RAM-based storage device having a lower latency but typically lower storage capacity.

In addition, the above-described "snapshot" approach to evaluating stream data may not always be appropriate since the changes in values over an interval can be important for stream processing applications, for example where the application needs to make a decision based on changes in a monitored temperature. Furthermore, the inability to specify QoS requirements for processing a query (such as latency or response time) to a traditional DBMS makes its usage less acceptable for stream-based applications.

Hence, the techniques developed for DBMSs need to be re-examined to meet the requirements of applications that use stream data. This re-examination has given rise to a paradigm shift along with new approaches and extensions to current techniques for query modelling, optimization, and data processing in order to meet the requirements of an increasing number of stream-based applications. Systems that have been developed to process data streams to meet the needs of stream-based applications are widely known as data stream management systems (DSMSs). An overview of data stream management systems is provided in "Stream Data Processing: A Quality of Service Perspective" by S. Chakravarthy and Q. Jiang (ISBN: 978-387-71002-0). In the following, a brief review of certain keys aspects of DSMSs that are necessary for understanding the concepts described herein is provided.

FIG. 2 shows a DSMS 10 together with a DSMS client 20. Queries for DSMS 10 are also expressed in a standard language similar to SQL (e.g. Continuous Query Language (CQL) and its derivatives) and a query plan is also produced, by a query parsing/planning unit 6. The logical query plan is analogous to a query tree used in a conventional DBMS. However, the queries executed in a DSMS are termed "continuous queries" (CQs) and differ from their DBMS counterparts principally by being specified once (commonly via provisioning, e.g. via operation and maintenance interfaces) and then evaluated repeatedly against new data over a specified life span or as long as there is data in the input stream(s) 11. In some DSMS systems, the query language is specified at such a low level that it might be directly handled as a query plan by itself.

Incoming streams 11 to, and outgoing streams 12 from, the DSMS 10 can be regarded as an unbounded sequence of data items that are usually ordered either explicitly by a time-based reference such as a time stamp, or by the values of one or more data elements (e.g. the packet sequence identifier in an IP session). A data item of a data stream can be regarded as a tuple of a relation. In this context, tuples comprise a known sequence of fields and essentially correspond with application-specific information. Hereinafter, the terms "data item" and "tuple" are used interchangeably.

The query plan generated on the basis of the specified CQ consists of algorithms for implementing a (typically large)

number of relational operators, such as "select", "project", "join" and "aggregation" operators. As will be explained in the following, the inputs and outputs of these operators are interconnected to process a data stream in the desired way to yield the query result, such that the operators in a query plan may be regarded as nodes of a network. The operators act on data elements as they arrive and cannot assume the data stream to be finite.

In a DSMS, the query operators can be classified as being either "stateless" operators (also referred to in the literature as "non-blocking" operators) or "stateful" (or "blocking") operators.

Generally, stateless operators process data elements from a data stream individually (i.e. a single data element at a time) and thus do not impose any special requirement on data streams, since their logic can be executed in a rather straight-forward way. One example of a stateless operator is an operator implementing a "filter" function. For example, a filter operator may process a received data stream by allowing data elements whose values exceed a predetermined value to pass through, and discard other data elements. Other examples of stateless operators include the aforementioned "select" and "project" operators.

On the other hand, there are operators, such as the "join" and "sort" operators that naturally operate on complete data sets and will therefore produce no output until the data stream ends. Of course, if the result to be produced by such a "stateful" operator had to be obtained by processing the whole data stream, the result would (likely) never be produced. In order to output results continuously, stateful (blocking) operators need to be converted into stateless (non-blocking) operators, and this is often achieved by employing the concept of a "window" to produce finite relations out of a stream. The window is used to define a finite subset of the data in the data stream, which is to be processed by the stateful operator. The window can be specified in a number of different ways, for example as a function of time (e.g. 3 seconds) or as a function of the number of received data items (e.g. 40 data items in a row).

Multiple queries can be executed at the same time within the DSMS 10, and each single query plan can share operators, or even part of its query plan, with other queries. Moreover, more than one DSMS client application 20 can be registered to the same query, and more than one input stream 11 can be part of the same query.

By way of a simplified example, FIG. 3 shows two CQs being executed in the same DSMS. In this example, the DSMS receives data via two input data streams (illustrated as "Stream 1" and "Stream 2") and produces two output data streams towards different destinations outside the DSMS, namely a first server implementing a first application "App1", and a second server implementing a second application "App2". In FIG. 3, "$O_n$" represents a query operator, and query operators linked by the continuous lines execute a first CQ (i.e. implement the query plan of said first CQ). The query operators linked by the dashed lines execute a second CQ. A query operator can implement different operations, such as a "filter", based on received values from input data streams (for example, so that only certain data elements matching a certain value, or alternatively exceeding or being below a given threshold, are processed further) and/or a "join" of values received from one or more input data streams (for example, so that only certain data elements coming from a first data stream are considered for further processing, depending on certain matching values received from a second data stream).

For example, "Stream 1" could be received from a first telecommunications node providing a location registration service (such as a "Home Subscriber Server", HSS), which sends towards the DSMS a data stream containing information about registration events of users from their terminals (e.g. the data stream comprising data identifying a user, identifying the roaming access network to which a user currently attaches, whether a user registers or deregisters, etc.). "Stream 2" could be received e.g. from a second telecommunications node providing multimedia communications services to a plurality of users (such as a "Proxy-Call Session Control Function", P-CSCF), which sends towards the DSMS information about communication service events related to said users (e.g. identifying the user, session initiation/termination events, the kind of communication service established, and so on).

In many practical applications, the query plan associated with a continuous query is usually a highly complex entity consisting of a large number of stateful and stateless operators, wherein each operator is associated with a memory queue (or buffer) for buffering tuples during bursty input periods (in order not to lose incoming or partially processed data), with the stateful operators requiring resources (primarily main memory) to hold state information to perform window-based computations successfully. For example, the "symmetric hash join" operator requires hash tables for its two relations for the duration of the window.

In such applications, and where the processing of huge amounts of data that are received at high rates via a large number of data streams is required (as is often the case in practice), the processing burden placed on an implementation of the DSMS in a single piece of hardware may exceed the hardware capabilities, leading to an unacceptable drop in the QoS. Furthermore, a stand-alone DSMS may not be able to handle the required number of input connections. In these cases, it becomes necessary to deploy the DSMS query plan in a distributed environment, where the incoming data streams and/or CQ processing load are/is shared among separate data processing hardware components.

The CQ processing load may be distributed by replicating the same query plan on separate data stream management systems, so that each DSMS executes the same query plan on a respectively assigned subset of the data streams that are to be processed. In this kind of distributed data stream processing environment, the data processing load is shared among a plurality of separate DSMSs that execute the same CQ. This approach can also be taken where the stream sources belong to different administrative domains, so that a separate DSMS server (or other DSMS hardware implementation) is provided to handle the data tied to each domain.

In these kinds of scenarios, and under certain premises, the query execution logic might not require all of the data coming from each possible data source to be gathered in order to come up with the final result. For instance, in user-centric networks (i.e. those in which the data includes a user identifier, such as the MSISDN or IMSI in a telecommunications network), the query logic usually depends on specific behaviours of users or groups of users (for example, the query could stipulate: "determine the number of voice calls that users categorized as "gold" subscribers place in the next two hours"). Thus, as long as data belonging to different users can be processed independently, is possible to replicate the corresponding query as many times as needed.

An example of a distributed data stream processing system comprising a plurality of DSMSs that replicate the query plan is illustrated in FIG. 4. In this example, two DSMSs, namely DSMS #1 and DSMS #2, are arranged to receive data streams from a subset #1 of the available data sources and a subset #2 of the data sources, respectively, and to use the same query plan to process the received data streams. Depending on the query logic, this strategy might need a further post-processing stage that merges the partial results obtained by each DSMS, as also shown in FIG. 4.

Despite the above-described distribution of the CQ processing workload, one or more of the DSMSs may still lack adequate computing resources to fulfil performance requirements, due to the over-demanding requirements of specific query operators. For example, an operator storing large amounts of historical data may demand large amounts of memory. That is, available computing resources (CPU, memory, etc.) are limited and might not fit the overall query demands. Furthermore, even if the computing resources do fit the specific query demands, the number of queries being simultaneously executed may be so high that it is not possible to assure that all of them will meet their QoS requirements.

Under these circumstances, it may be desirable to further distribute the CQ processing workload by partitioning a query plan in one or more of the DSMSs of the distributed data stream processing system into different parts, each containing at least one query operator, and deploying each of the parts on a different data processing apparatus. This approach is illustrated in FIG. 5, where the query plan of FIG. 3 is partitioned into four parts, namely Part #1, Part #2, Part #3 and Part #4, and each of the parts is assigned to a different data processing apparatus (e.g. a stand-along computer such as a server) for execution.

However, even when the above-described measures have been taken to distribute the CQ processing workload, the bursty nature of the incoming streams can still prevent the DSMSs from maintaining the required tuple processing rate whilst data is being received at an excessively high rate. As a result, a large number of unprocessed or partially processed tuples can become backlogged in the data stream processing system, causing the tuple processing latency to increase without bound. Due to the predefined QoS requirements of a CQ, query results that violate the QoS requirements may become useless.

One known approach to dealing with such data overload situations is so-called "load shedding". When the DSMS 10 is overloaded with data from the input data stream(s) 11, load shedding is performed, i.e. at least some of the data items (tuples) as received by the DSMS or partially processed by the DSMS are discarded in order to reduce the processing burden of the DSMS 10 in generating the output data stream. In other words, load shedding involves selecting which of the tuples should be discarded, and/or in which phase of the CQ execution the tuple(s) should be dropped. Such discarding of tuples is often acceptable as many stream-based applications can tolerate approximate results.

In a conventional distributed data stream processing system as described above, wherein the query plan in each DSMS of the data stream processing system includes a window-based (stateful) operator, the situation can arise where reception of a windowed portion of the data stream switches at least once from one DSMS to another, so that two or more of the DSMSs in the system receive data from the windowed portion of the data stream. Under these circumstances, the accuracy of the respective query results obtained by those DSMSs may be poor, owing to the relatively small set of data that is received by each DSMS (as compared to the case where no switching occurs). For example, if a query operator stores the top five visited URLs in a time window covering the last two hours, and an input data stream switches from being received by a first DSMS to a second DSMS when one hour and thirty minutes have already elapsed, then the result provided by the second DSMS will likely be less accurate than that provided by the first DSMS.

Moreover, even in cases where it is possible to replicate the query without affecting the validity of the final result, it would still be necessary to develop a post-processing stage capable of gathering the results from the DSMSs that have received and processed the windowed portion of the data stream. However, this approach would require a specific design/implementation for every issued query, which might require a deep understanding of the query logic (that can be very complex) as well as advanced programming skills. Moreover, this logic should also take into account the query QoS constraints (e.g. time execution). Furthermore, in case the post-processing stage is common to every query being executed in the system, the complexity would increase. Further still, if the post-processing stage is implemented per query basis, the usage of computing resources will not be optimal (e.g. the outcome of two different queries might share several output streams). The time needed for tuning the post-processing stage might be unacceptable in many cases; the requested queries should be executed almost immediately, in order to obtain results as soon as possible. Finally, if the number of DSMSs in the distributed data stream processing system changes over time, the post-processing logic would likely be affected.

SUMMARY

Accordingly, there is a great need to address at least some of the deficiencies of conventional distributed data stream processing systems that have been outlined above.

The present inventors have conceived an elegant and effective way of reducing processor workload and memory usage in a distributed data stream processing system comprising a plurality of DSMSs, each executing a CQ having at least one window-based operator, specifically in circumstances where reception of stream data that are to be processed as a windowed portion by the CQ switches from one DSMS in the system to another. In addition to the reductions in processor workload and memory usage, the control techniques described herein can also reduce the complexity and processing overhead of the aforementioned post-processing stage, allowing the distributed data stream processing system to deliver superior QoS.

A controller is provided for controlling the processing of a data stream by a data stream processing system comprising a plurality of DSMSs, wherein each DSMS is arranged to execute a respective continuous query comprising an operator arranged to operate on windowed portions of the input data stream to generate an output data stream comprising continuous query execution results, and wherein the controller is configured to control the execution of the continuous query on a windowed portion of a data stream when different DSMSs receive different parts of the data for the windowed portion. The controller comprises a reception predictor arranged to predict how the identity of the DSMS receiving the data stream will change based on prior receptions of the data stream by the DSMSs. The controller further comprises a DSMS selector arranged to select, for processing of the windowed portion of the data stream, based on the prediction made by the reception predictor and the size of a window used to obtain the windowed portion of the data stream, a single DSMS of the plurality of DSMSs that is to execute the respective continuous query. The controller also includes a control signal generator arranged to generate a control signal to cause only the selected DSMS to execute the continuous query using data in the data stream received thereby, so that the continuous query is executed on data in the windowed portion of the data stream only by the selected DSMS.

A data stream processing system is also provided, comprising a plurality of DSMSs and a controller as set out above.

Thus, it will be appreciated that, during its operation, the controller predicts how the identity of the DSMS receiving the data stream will change and, based on this prediction and the window size, selects a single one of the DSMSs that is execute the CQ on the data received by the selected DSMS. The controller generates a control signal to cause only the selected DSMS to execute the CQ on data in the data stream that is to be processed as a windowed portion. In this way, the processing of the portion(s) of this data that is/are received by the other DSMS(s)—not only the processing performed by the window-based operator but also by any subsequent operators in the query plan of the other DSMS(s)—can be avoided, along with the associated processor and memory usage. The valuable system resources that are freed up in this way can be reallocated to other tasks, in order to improve overall system performance.

For example, in cases where the data stream processing system is under heavy load from data arriving at a high rate via a large number of input data streams (as often occurs in practical applications, where data stream sources can be bursty), the CQ execution control techniques described herein can allow system hardware resources to be reallocated so that, while data in a part of an input data stream, which is to be processed as a windowed portion, can be processed by one of the DSMSs to provide a useful CQ execution result, the resources that are freed up are available for the processing of the data from other input streams. This can obviate for raise the threshold for) the deployment of the system's load shedding mechanism and thus improve the accuracy of CQ execution results. An improvement in CQ result accuracy occurs particularly if continuity of data in the window is important for the operator of the CQ, where the shedding of some of those data items by the system would be undesirable.

A method is also provided for controlling the processing of a data stream by a data stream processing system comprising a plurality of DSMSs, wherein each DSMS is arranged to execute a respective continuous query comprising an operator arranged to operate on windowed portions of the input data stream to generate an output data stream comprising continuous query execution results, and wherein during reception of the data to be processed as a windowed portion of the data stream, the DSMS receiving the data stream changes. The method comprises predicting how the identity of the DSMS receiving the data stream will change based on prior receptions of the data stream by the DSMSs. The method further comprises determining the size of a window used to obtain the windowed portion of the data stream and selecting, for processing of the windowed portion of the data stream, based on the prediction and the determined window size, a single DSMS of the plurality of DSMSs that is to execute the respective continuous query. The method further comprises generating a control signal to cause only the selected DSMS to execute the continuous query using data in the data stream received thereby, so that the continuous query is executed on data in the windowed portion of the data stream only by the selected DSMS.

Furthermore, there is provided a computer program product, comprising a non-transitory computer-readable storage medium or a signal, carrying computer program instructions which, when executed by a processor, cause the processor to perform a method as set out above.

BRIEF DESCRIPTION OF THE DRAWINGS

Embodiments of the invention will now be explained by way of example only, in detail, with reference to the accompanying figures, in which.

DETAILED DESCRIPTION

The embodiments described herein provide mechanisms for controlling the processing, within a data stream processing system comprising a plurality of DSMS servers, of input data streams coming from a plurality of data sources, wherein each DSMS server is arranged to execute continuous queries on the input data streams it receives so as produce output data streams.

The scenario disclosed by the following embodiments envisages cases wherein different DSMS servers can receive an input data stream originating directly from a moving data source (e.g. in the case of a mobile terminal being carried by a travelling user), or receive the input data stream indirectly, e.g. an input stream originating from one or more fixed data sources that report data (e.g. position, temperature, etc.) relating to a physical device (such as a user terminal, a pack, a vehicle, etc.) that moves whilst it is being controlled or monitored by the fixed data source(s), and wherein a certain input data stream can be received by different DSMS servers depending on the location of the data source.

Some of the embodiments comprise generating a query plan for the DSMS servers for ensuring that continuous queries to be executed on data conveyed by a certain input data stream are finally held by only one DSMS server of the plurality. According to some of the described embodiments, an input data stream referring to a certain identified element (such as a mobile device) is processed by a single (selected, first) DSMS during a time window; which can imply forwarding certain received input data streams from another (second) DSMS towards said single (first) DSMS.

Some of the embodiments described herein allow the accuracy of the output data streams produced by the continuous queries executed by the DSMSs of the data stream processing system to be increased, when said continuous queries comprise window-based (stateful) operators that are to be executed over data received via an input data stream, and said input data stream can be received by different DSMSs server instances. This is achieved by analysing how the incoming data stream will likely reach different DSMSs, and by selecting, based on said analysis, a single DSMS for executing the corresponding continuous query for a certain input data stream during a time window.

Figure 1:
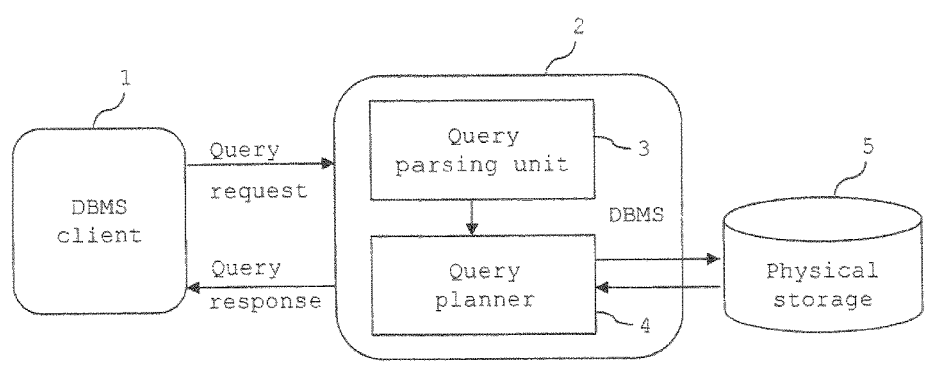
FIG. 1 is a block diagram illustrating the interaction in a conventional system between a DBMS client, a DBMS and a storage device of the DBMS.
Figure 2:
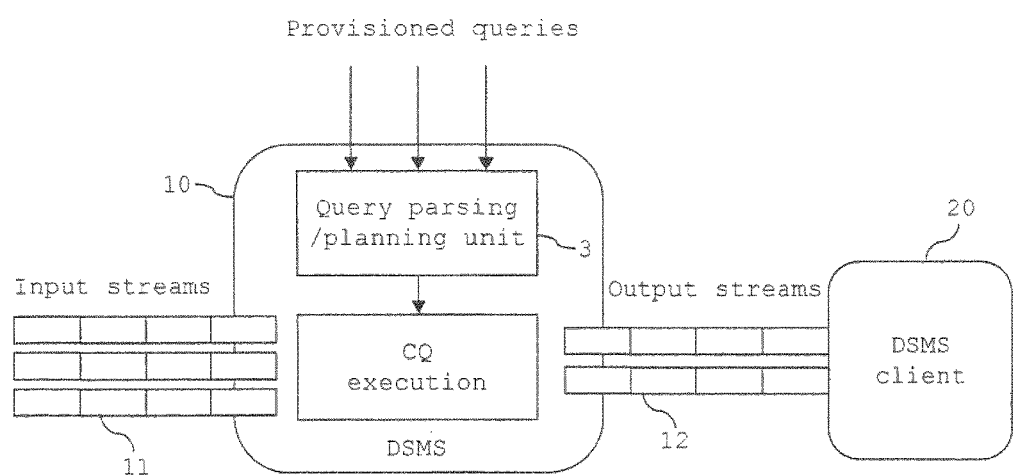
FIG. 2 is a block diagram showing a conventional DSMS serving a DSMS client.
Figure 3:
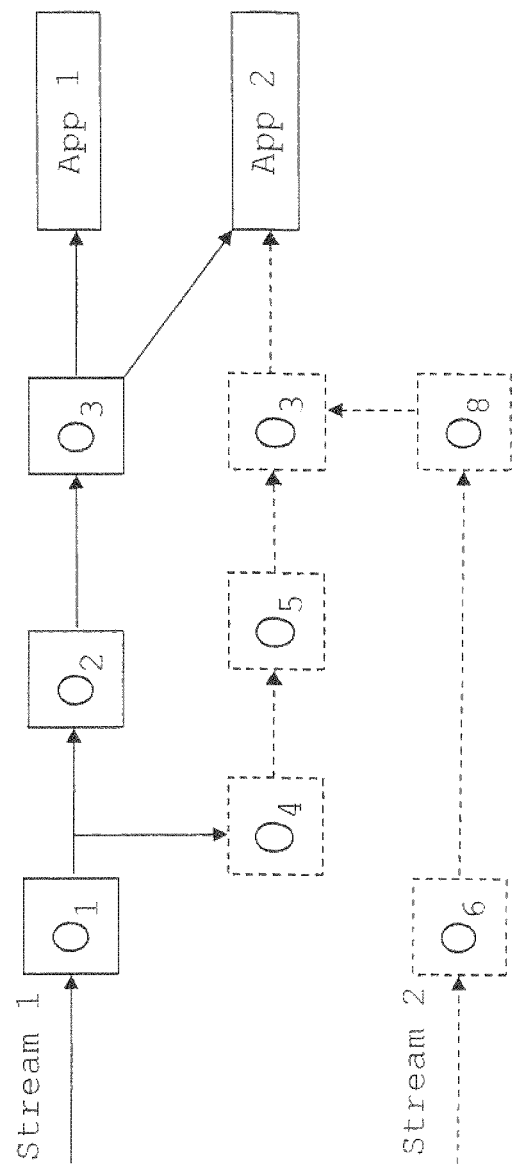
FIG. 3 is a block diagram showing an implementation of two continuous queries in a single DSMS.
Figure 4:
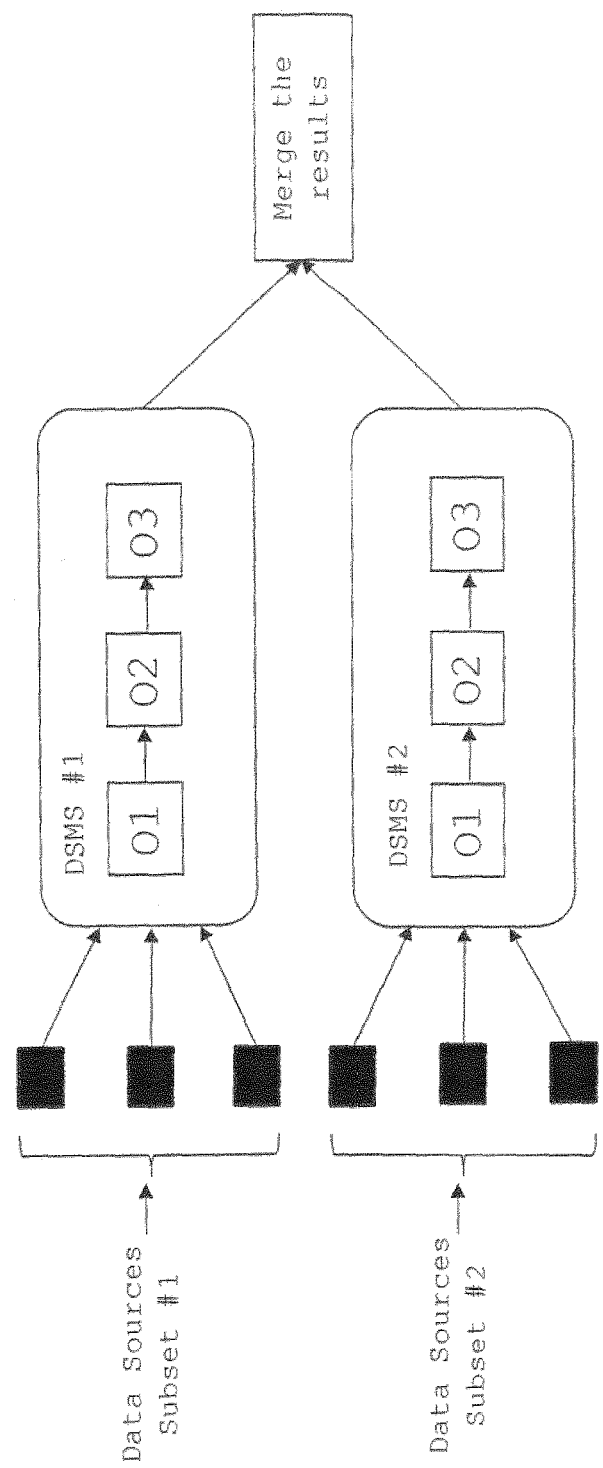
FIG. 4 is a block diagram showing a background example of a distributed data stream processing system, in which the same continuous query is executed by two data stream management systems.
Figure 5:
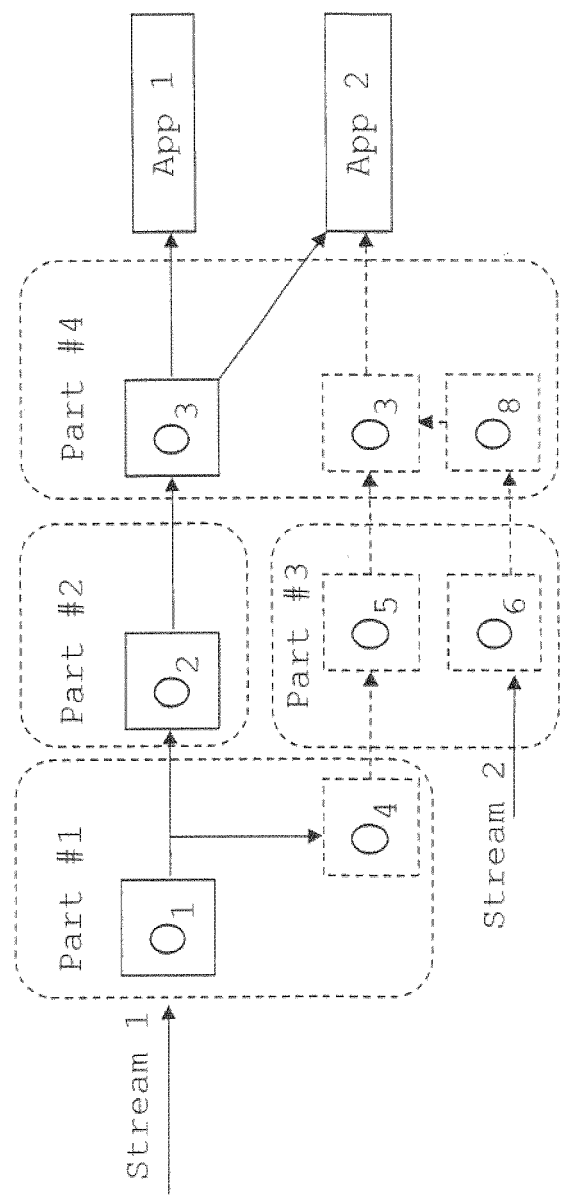
FIG. 5 is a block diagram showing another background example of a distributed data stream processing system, in which a continuous query is partitioned into four parts, with each part being assigned to a different data processor for execution.
Figure 6:
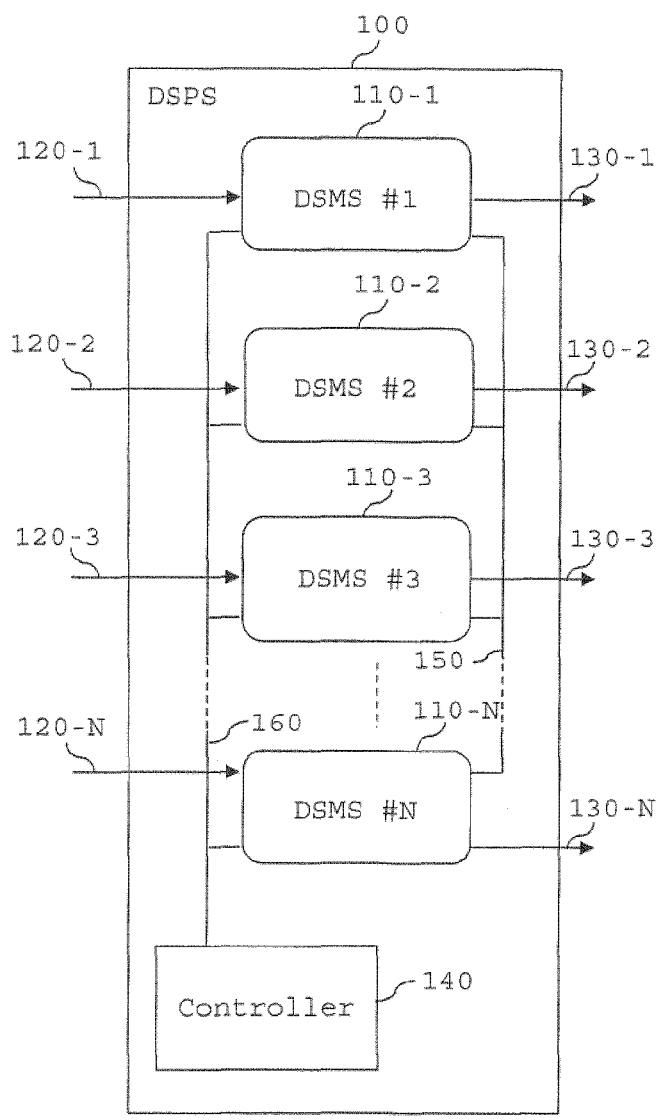
FIG. 6 is a block diagram showing a distributed data stream processing system according to an embodiment of the present invention.

FIG. 6 shows a data stream processing system (DSPS) according to an embodiment of the present invention. The DSPS 100 comprises a plurality of N DSMSs 110-1 to 110-N, each of which is configured to receive data items from one or more respective input data streams (120-1 to 120-N), which is/are provided in the form of a suitably modulated electrical, optical or radio signal. In general, each DSMSs 110-1 to 110-N may receive a plurality of data streams (at least some which may be multiplexed) over one or more physical channels, which may take any desirable form (e.g. optical fibers, coaxial cables etc.). Furthermore, the input data streams 120-1 to 120-N may be irregular and, at times, bursty in nature (such as a local Ethernet traffic stream or an HTTP traffic flow). The data types of attributes in the data stream 120 can be well-structured (e.g. temperature readings), semi-structured (e.g. HTTP log stream), or unstructured (e.g. emails).

Each of the DSMSs 110-1 to 110-N is operable to execute a plurality of continuous queries against the data items received thereby to generate at least one output data stream, 130-1 to 130-N. The following discussion, however, will focus on one particular set of CQs that are executed in the DSPS 100, each by a respective one of the DSMSs 110-1 to 100-N. These particular CQs have in common at least one stateful relational operator that is arranged to operate on windowed portions of the data stream received thereby. The size of the window used by the operator may be defined in terms of a period of time (e.g. one hour), as in the present embodiment, so that the operators generates its output based on data items received thereby in a specified period of time. Alternatively, or additionally, the window size may be defined in other ways, for example in terms of the number of data items that the operator needs to receive in order to generate an output.

In the present embodiment, each of the DSMSs 110-1 to 110-N is implemented in a separate, suitably programmed signal processing device, more specifically in the exemplary form of a stand-alone server. One or more of the DSMSs 110-1 to 110-N may, however, alternatively be hosted by a single such programmable signal processing device so that they make use of common data processing and storage resources (CPU, memory etc.) during their operation.

The DSMSs 110-1 to 118-N may be configured to exchange stream data received thereby over a stream data communication channel 150, which may be provided in any suitable form, for example a bus (e.g. InfiniBand) or a network (e.g. the Internet, or a Local area network such as Ethernet).

As shown in FIG. 6, the DSPS 100 also includes a controller 140 for controlling the processing of data by the DSMSs 110-1 to 110-N. The functionality of the controller 140 described herein may, as in the present embodiment, be implemented in a separate suitably programmed signal processing device; that is, implemented in a separate device (i.e. apparatus) independent of apparatuses implementing each of the plurality of the DSMSs of the data stream processing system. Alternatively, the functionality of the controller 140 can be implemented within one or more of said plurality of DSMSs devices. In this latter implementation (and among other features), when a particular DSMS device receives a request for implementing and executing a CQ on an input data stream for which a client has requested to receive an output data stream generated by a DSMS, the controller 140 within said particular DSMS can, as will be disclosed in detail hereinafter, generate the corresponding control signals towards one or more of other DSMSs, so as to set out therein the corresponding query plans for accomplishing with the requested CQ.

The controller 140 generates control signals for the DSMSs 110-1 to 110-N based on information it receives from the DSMSs in the manner described below. Information and control signals are communicated between the controller 140 and the DSMSs 110-1 to 110-N over a controller communication channel 160, which may be provided in any suitable form known to those skilled in the art, as noted above. However, it should be noted that communication amongst the DSMSs 110-1 to 110-N, and between the controller 140 and the DSMSs 110-1 to 110-N, may alternatively proceed via a shared such communication channel.

Figure 7:
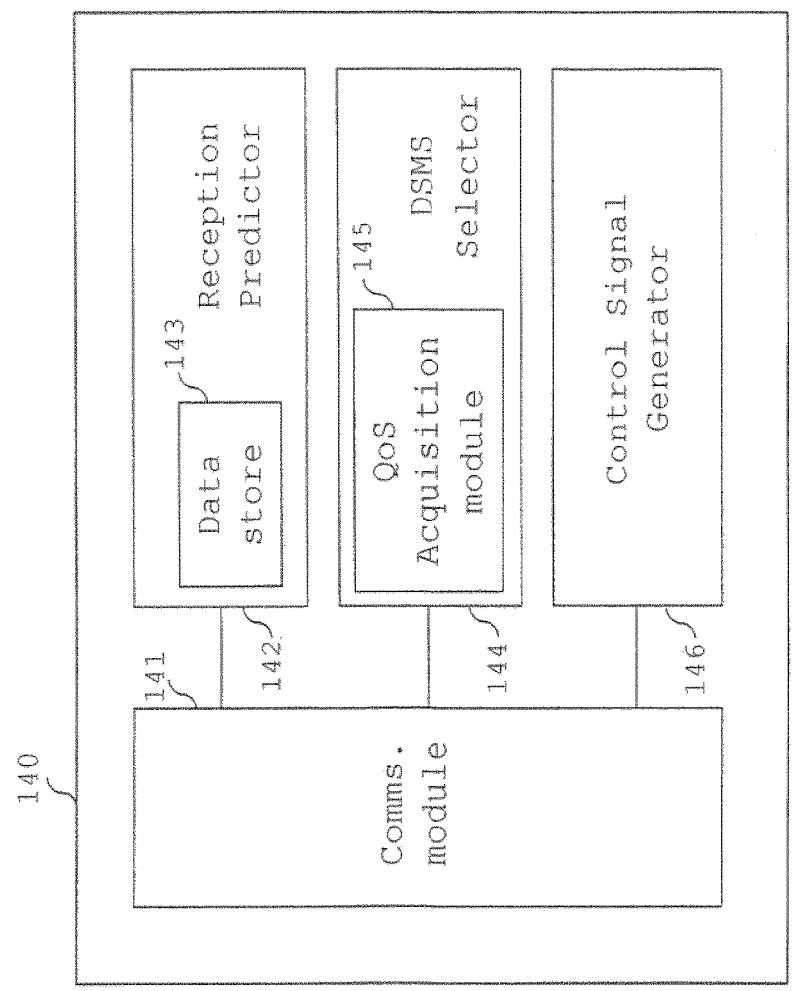
FIG. 7 is a block diagram showing further details of the controller shown in FIG. 6.

FIG. 7 shows features of the controller 140 of the present embodiment. In this embodiment, the controller 140 comprises a control application deployed on a programmable signal processing apparatus, such as a server. The controller 140 includes a communication module 141, a reception predictor 142 optionally comprising a data store 143, a DSMS selector 144 optionally including a QoS acquisition module 145, and a control signal generator 146.

The communication module 141 interfaces the DSMSs 110-1 to 110-N with the remaining components of the controller 140, and functions to receive information concerning the performance of the DSMSs 110-1 to 100-N, including bandwidth capacity and/or usage (and upper limit, if any) of the stream data communication channel 150, and CPU loads of the CPUs in the DSMS servers 100-1 to 100-N running the DSMS applications.

The data store 143 may be non-volatile memory such as a magnetic computer storage device (e.g. a hard disk) or a volatile memory such as DRAM or SRAM. The reception predictor 142, DSMS selector 144 and control signal generator 146, on the other hand, comprise hardware which implements procedures that may form at least a part of a computer program or a sequence of instructions executable by the programmable signal processing apparatus. These procedures, when executed by the signal processing apparatus, result in the generation of control signal for the DSMSs 110-1 to 110-N in a manner which will be described below.

Figure 8:
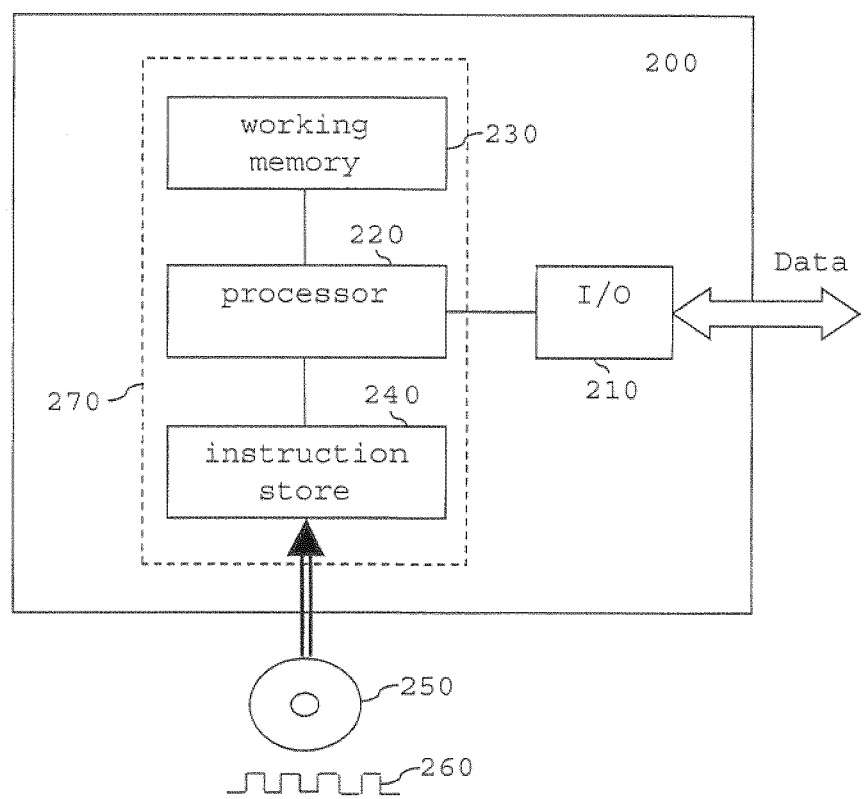
FIG. 8 is a block diagram showing an example of computer hardware capable of functioning as the controller shown in FIG. 7.

An example of a general kind of programmable signal processing apparatus in which the controller functionality may be implemented is shown in FIG. 8. The signal processing apparatus 200 shown comprises an input/output section 210, a processor 220, a working memory 230, and an instruction store 240 storing computer-readable instructions which, when executed by the processor 220 cause the processor 220 to perform the processing operations hereinafter described to generate control signals for the DSMSs 110-1 to 100-N.

The instruction store 240 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 240 may comprise a volatile memory (e.g. DRAM or SRAM), and the computer-readable instructions can be input thereto from a computer program product, such as a computer-readable storage medium 250 (e.g. an optical disc such as a CD-ROM, DVD-ROM etc.) or a computer-readable signal 260 carrying the computer-readable instructions.

The working memory 230 functions to temporarily store data to support the processing operations executed in accordance with the processing logic stored in the instruction store 240. As shown in FIG. 8, the I/O section 210 is arranged to communicate with the processor 220 so as to render the signal processing apparatus 200 capable of processing received signals and communicating its processing results.

In the present embodiment, the combination 270 of the processor 220, working memory 230 and the instruction store 240 (when appropriately programmed by techniques familiar to those skilled in the art) together constitute the communications module 141, reception predictor 142, DSMS selector 144, QoS acquisition 145 and the control signal generator 146 of the controller 140. The combination 270 also performs the other operations of the controller 140 that are described herein.

The operations performed by the controller 140 to control the execution of the continuous query on a windowed portion of a data stream, when different DSMSs receive different parts of the data for the windowed portion, will now be described with reference to FIGS. 9 and 10.

As has already been outlined above, the controller 140 of the present embodiment controls the processing of a data stream by the DSPS 100, wherein each DSMS in the DSPS 100 is arranged to execute a respective CQ comprising an operator arranged to operate on sets of data from respective windowed portions 120A of the input data stream 120 to generate an output data stream 130 comprising continuous query execution results, specifically in circumstances where reception of such a set of data switches from one DSMS 110 to another at least once; that is, where a set of data items in the input stream, which would be received by a single DSMS and processed by its operator as a windowed portion if no switch were to occur, is instead received by more than one DSMS of the DSPS 100.

Figure 9:
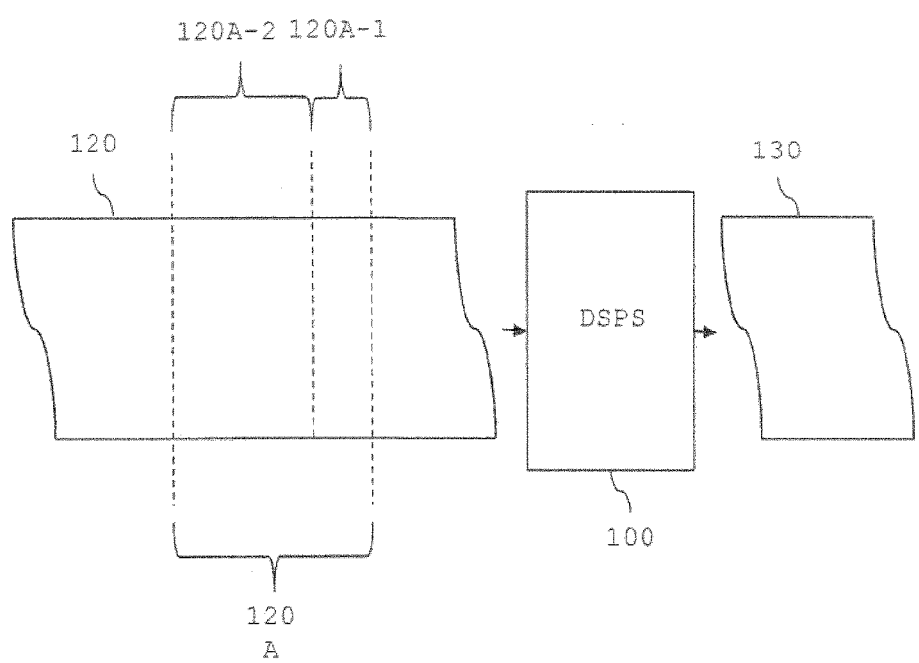
FIG. 9 schematically illustrates a portion of the data stream received by the distributed data stream processing system of the embodiment.

Such a switch in data stream reception is schematically illustrated in FIG. 9. More specifically, FIG. 9 is a schematic of a section of a data stream 120 that is transmitted to the DSPS 100, where the set of data that is to make up a windowed portion of the data stream for processing by the CQ is shown at 120A. In this example, a first part, 120A-1, of the data 120A is received by a first DSMS, 110-1. Then, following a switch in reception, the remaining part, 120A-2, of the data 120A is received by a second DSMS, which is DSMS 110-2 in this example. However, in other examples, there may be more than one switch so that the data 120A can be received by more than two of the DSMSs 110-1 to 110-N of the DSPS 100.

Figure 10:
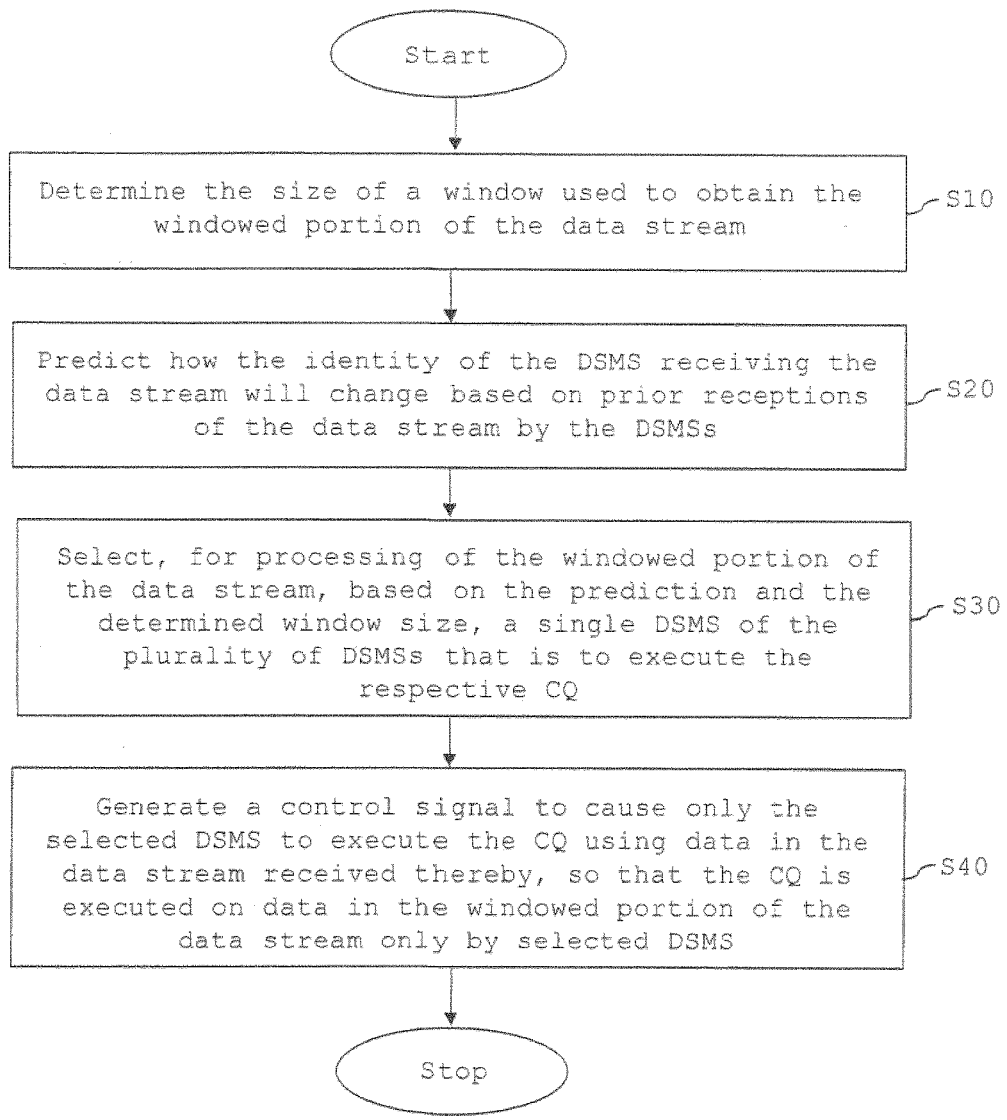
FIG. 10 is a flow chart showing the processing operations in a method of controlling the processing of a data stream by the distributed data stream processing system of the embodiment.

Referring now to FIG. 10, in step S10, the controller 140 determines the size of a window to be used to obtain the windowed portion of the data stream. For example, the controller 140 may receive a continuous query which a user wishes to be deployed and executed by one of the DSMSs 110-1 to 110-N. The continuous query specifies a window size that is required for a stateful operator forming part of the query plan. The controller 140 then determines the required window size from the received CQ. In the present embodiment, the window size is a time interval for gathering input data such that, when this time interval ends, the data received during the time interval should be processed to yield a result.

In step S20, the reception predictor 142 predicts how the identity of the DSMS receiving the data stream 120 will change based on prior receptions of the data stream 120 by the DSMSs 110-1 to 100-N.

The present inventors have realised that, in many and varied DSPS applications, changes in the identity of the DSMS receiving a data stream are (for whatever underlying reason) tied to the movement of a device; for example a mobile communication device, such as a cell phone or PDA, that is associated with the data stream. The mobile device may, as in the present embodiment, be the original source of the data stream. In this case, the changes in identity of the receiving DSMS may correlate with the movement of a mobile communication device e.g. between the cells of a telecommunications network, where there is provided for each cell a DSMS configured to process data that it receives from mobile devices located in the cell. Thus, in the present embodiment, the data stream processing system 100 receives a data stream associated with a mobile communication device, wherein the DSMS receiving the data stream is dependent upon the location of the mobile communication device.

However, data in respect of a mobile device may be associated with the data stream in a different way, for example in the case where the mobile device communicates with (or is monitored by) fixed (immobile) data stream sources, where the content of the data stream is dependent on e.g. information from, and/or location of, the mobile device as collected and eventually post-processed by different fixed (immobile) data stream sources. For example, a mobile communications terminal in the form of a cell phone or PDA may not be the original source of the data stream; instead, a fixed telecom network node may collect information concerning the mobile terminal, and generate a data stream towards a certain DSMS, conveying periodically e.g. information identifying the terminal (e.g. an identifier such as a MSISDN), the mobile terminal's current geographical location, the services it has requested and/or received in a certain period, etc.

Furthermore, the data stream need not be derived from data received from the mobile device and may otherwise be associated with the mobile device. For example, the data stream sources may be provided at respective air traffic control (ATC) sites of an integrated ATC system, where each data stream source generates data streams that carry data related to aircraft (e.g. aircraft positions and altitudes as determined by radar or otherwise) flying through the air space that is monitored by the respective ATC site.

Figure 11:
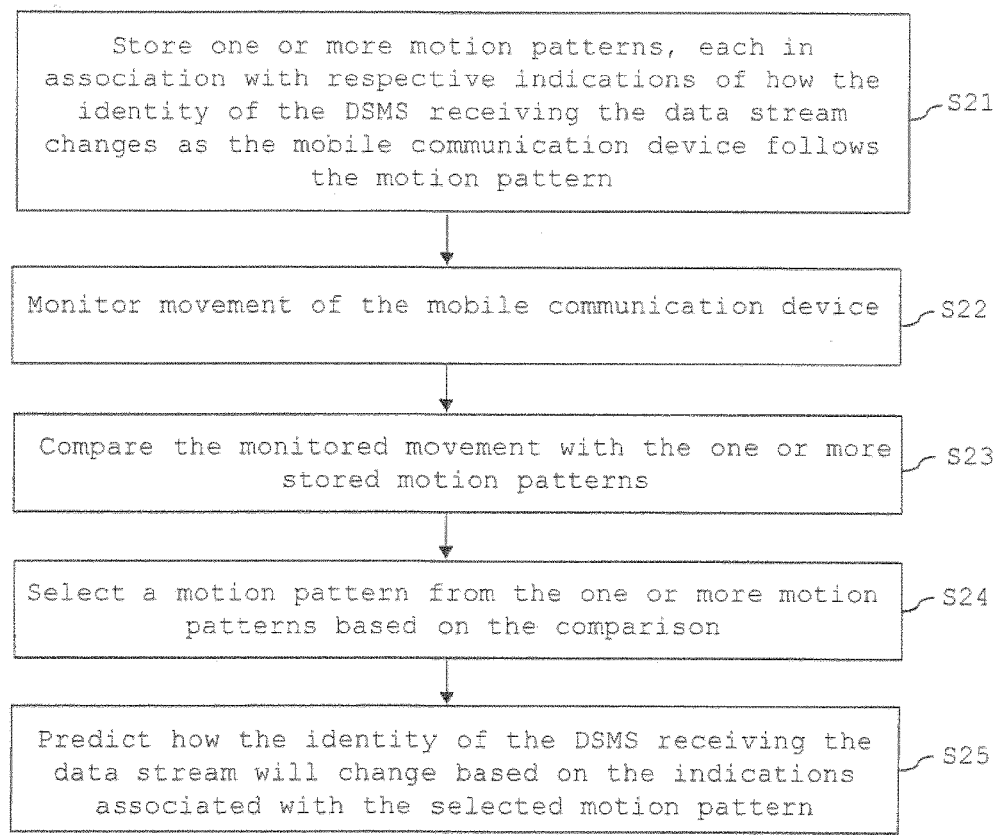
FIG. 11 is a flow chart showing example processing operations by which the reception predictor can predict how the identity of the DSMS receiving the data stream will change.

In the present embodiment, the reception predictor 142 monitors the movement of the mobile communication device and predicts how the identity of the DSMS receiving the data stream 120 will change based on the monitored movement. The movement may be monitored in a number of different ways. For example, each DSMS that receives the data stream from the mobile communication device may be configured to execute a CQ to extract location information from the data stream and forwarding the location information to the reception predictor 142 via the controller communication channel 160. Although the prediction of how the identity of the DSMS receiving the data stream 120 will change can be performed in different ways, the exemplary scheme that is used by the reception predictor 142 of the present embodiment to predict how the identity of the DSMS receiving the data stream 120 will change will now be described with reference to FIG. 11.

In step S21, the reception predictor 142 stores in data store 143 one or more motion patterns, each in association with respective indications of how the identity of the DSMS receiving the data stream 120 changes as the mobile communication device follows the motion pattern. The identity of a DSMS can be established by means of one or more identifiers that are currently usable to identify a network entity, such as an IP address, a transport address (an IP address plus a transport protocol port number), a Uniform Resource Identifier, etc. In one example, the stored data may be a table having a column of location information data items and another column of DSMS identifiers, wherein each row of the table comprises an item of location information identifying a certain location in one column, and a corresponding DSMS identifier in another column; the location information in the table defines a motion pattern for a mobile device and the associated DSMS identifiers indicate how the identity of the DSMS receiving the data stream changes as the mobile device follows the motion pattern.

In the present embodiment, the location information specifies a set of points at which the mobile communication device is located at different times as it follows a motion pattern; for example, the coordinates of the mobile communication device as obtained by a Global Positioning System (GPS) that tracks the location of the mobile communication device.

The location information may, however, be provided in a different form. For example, the geographical area over which the mobile device moves may be divided into a number of regions which take the form of (e.g. square) regions in a grid pattern. Each of these regions may be associated with respective location identifier that identifies the location of the region. In this case, the location identifier may comprise a set of one or more identifiers (such as a grid reference) that allow the position of the region in the grid pattern to be identified, so that the locations of the mobile device may be identified relatively coarsely, in terms of the region in which the mobile device is located.

In the present embodiment, the reception predictor 142 is operable in a learning mode to generate the motion patterns and the associated DSMS identifiers using stream mining techniques and to store the learned motion patterns and DSMS identifiers in the data store 143. Stream mining techniques are known to those skilled in the art, such that a further explanation thereof is unnecessary here. Pattern mining algorithms are preferably applied sufficiently frequently to ensure that the stored motion patterns continue to reflect likely movements of the mobile communication device. The motion patterns and DSMS identifiers could, however, alternatively be created and entered into the data store 143 by a user if the likely movements of the mobile communication device and the identities of the DSMSs that are to receive the stream data during the course of these movements are known to the user or can be predicted.

In step S22, the reception predictor 142 monitors the movement of the mobile device, receiving via the controller communication channel 160 a set of coordinates defining locations through which the mobile device has passed, as noted above.

In step S23, the reception predictor 142 compares the received set of coordinates with the motion patterns stored in the data store 143. In the present embodiment, the reception predictor 142 performs the comparison by calculating the degree of correlation between the received coordinates and each stored motion pattern.

In step S24, the reception predictor 142 selects a motion pattern from the stored motion patterns based on the comparisons made in step S23, specifically by selecting, as the matching motion pattern, the stored motion pattern that gives the highest degree of correlation with the monitored movement of the mobile device.

In step S25, the reception predictor 142 uses the indication of how the identity of the DSMS receiving the data stream 120 changes as the mobile communication device follows the motion pattern selected in step S24 to predict how the identity of the DSMS receiving the data stream 120 will change.

Referring again to FIG. 10, in step S30, the DSMS selector 144 selects, for processing of the windowed portion 120A of the data stream 120, based on the window size determined in step S10 and the prediction made in step S20, a single one of the DSMSs 110-1 to 110-N that is to execute the continuous query programmed into the selected DSMS. This selection may be performed in different ways, and the exemplary scheme that is used by the DSMS selector 144 of the present embodiment to select the single DSMS will now be described with reference to FIG. 12.

Figure 12:
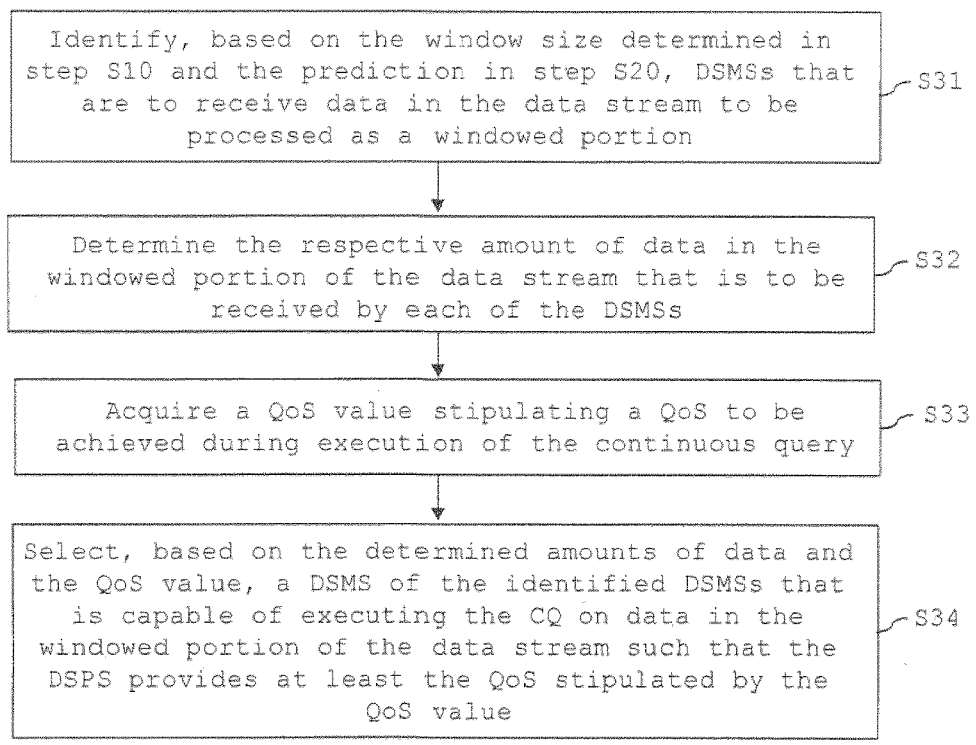
FIG. 12 is a flow chart showing example processing operations by which the DSMS selector can select a single DSMS that is execute a continuous query.

Referring to FIG. 12, in step S31, the DSMS selector 144 uses the window size determined in step S10 and the prediction made in step S20 to identify the DSMSs that are to receive the data in the windowed portion 120A of the data stream 120. In the present embodiment, the DSMS selector 144 is able to predict, from the rate at which it has determined the mobile device to be following the selected motion pattern, and the length of the specified time window, which of the DSMSs will receive the data stream from the mobile device during the course of the time window. The identities of the DSMS that have been identified in this way are then preferably stored by the DSMS selector (in data store 143 or elsewhere).

In step S32, the DSMS selector 144 determines the respective amount of the data in the windowed portion 120A that is to be received by each of DSMSs that have been identified in step S31. In the present example, upon receiving a data stream 120 as illustrated in FIG. 9, the DSMS selector 144 would use the indication of how the identity of the DSMS receiving the data stream 120 changes as the mobile communication device follows the motion pattern selected in step S24, and the window size, to predict the amount of data in portion 120A-1 to be received by DSMS 110-1 before the switch in reception occurs, and the amount of data in portion 120A-2 to be received by DSMS 110-2 after reception switches to DSMS 110-2. This prediction may, as in the present embodiment, be obtained on the assumption that the data in the data stream 120 will be received at the same rate by the identified DSMSs 110-1 and 110-2, or it may be based on data reception rates for the respective DSMSs (which may differ due to e.g. varying levels of network congestion experienced by different DSMSs), which have previously been measured or estimated by the DSMS selector 144.

Optionally, in step S33, the QoS acquisition module 145 of the DSMS selector 144 acquires a QoS value stipulating a QoS to be achieved during execution of the CQ. The QoS requirements may be posed by the CQ and/or the application registering the query and commonly relate to aspects on the delivery by the DSMS(s) of the corresponding output data stream(s) produced therein by the execution of one or more continuous queries. For example, an application may demand that, for a specific network subscriber associated with the mobile device, the result should be fully guaranteed in terms of accuracy (e.g. for security reasons), meaning that no data loss (or no more than a certain amount of data loss) should be accepted. Additionally or alternatively, the QoS requirement may relate to the maximum tuple processing latency that the application can accept.

In the present embodiment, the communication module 141 of the controller 141 obtains information usable to monitor the performance of the DSPS 100, which can be used by the DSMS selector 144, e.g. via the QoS acquisition module 145, for the DSMS selection process. In particular, the communication module 141 can obtain, via the controller communication channel 160, information about data processing workloads of at least a set of the DSMSs (110-1 to 110-N) of the data stream processing system (preferably, at least in respect of the DSMSs identified in step S31) to determine the availability of those DSMSs to process data from the data stream 120. Furthermore, the communication module 141 can obtain information about the bandwidth usage of the stream data communication channel 150.

In step S34, the DSMS selector 144 selects a single DSMS from among the identified DSMSs (in this example, DSMSs 110-1 and 110-2) based on the amounts of data determined in step 32 and, optionally, the monitored performance of the DSPS 100. For improved CQ result accuracy, the DSMS selector 144 preferably selects, from the identified DSMSs, the DSMS that will receive the most data. As can be appreciated from FIG. 9, DSMS 110-2 would receive more data than DSMS 110-1 and would therefore be preferentially selected in step S34. The selection of the DSMS receiving the most data in the windowed portion 120A (in this example, DSMS 110-2) may, however, be subject to that DSMS being able to satisfy any QoS requirements that may be determined in step S33, and to the availability of the DSMS to process data from the windowed portion. In the present example, if DSMS 110-2 is unable to generate a CQ result from the windowed portion of the input stream 120 quickly enough for the client application, then DSMS 110-1, which can meet these QoS requirements, would be selected in step S34 instead. If none of the identified DSMSs are able to satisfy the QoS requirements and/or are unavailable to process data from the windowed portion 120A of the data stream 120, the DSMS selector 144 may nevertheless select one of the identified DSMSs (e.g. the one that comes closest to meeting the QoS and availability requirements), and the controller 140 would, in that case, manage the operation of the selected DSMS (e.g. by forcing it to drop one or more other CQs that it is executing) to make it available to process data in the windowed portion 120A of the data stream 120 whilst satisfying the QoS requirements.

Referring back to FIG. 10, in step S40, the control signal generator 146 generates a control signal to cause only the DSMS selected in step S30 to execute its CQ using data in the data stream 120 received thereby, so that the CQ is executed on data in the windowed portion 120A of the data stream 120 only by the selected DSMS. The control signal generator 146 may cause the DSMS selected in step S30 to execute its CQ using data in the data stream 120 received thereby in different ways, for example by controlling a router that may be provided in the DSPS 100 to route the data stream 120 to one of the DSMSs 110-1 to 110-N, in accordance with the controller's control signal. However, in the present embodiment, the controller 140 causes the selected DSMS to execute its CQ on data in the data stream 120 received thereby in a different way, which advantageously does not require the provision of such further hardware in the DSPS 100, or the control of network nodes or other components of a communication systems that conveys the data stream 120 to the DSPS 100. The operation of the control signal generator 146 of the present embodiment will now be described.

In step S40, the control signal generator 146 generates a control signal comprising instructions to configure each of the identified DSMSs with respective continuous queries such that only the selected DSMS executes the continuous query on data in the windowed portion 120A of the data stream 120. Thus, although the DSMSs 110-1 to 110-N are configured to execute largely the same CQ (i.e. the original CQ received e.g. by the controller 140, which is intended to be executed by any one of the DSMSs 110-1 to 110-N of the DSPS), the respective CQs finally configured to be executed by the DSMSs differ by comprising, in addition to a common set and arrangement of operators (i.e. as defined by the original CQ received), one or more filter/forwarding operators that are particular to each DSMS. Thus, in general terms, the controller 140 accepts a CQ that is to be executed on the data stream 120 by the DSPS and, based e.g. on the movement of the mobile device, the QoS requirements, the performances of the DSMSs and optionally usage of the stream data communication channel 150, generates modified versions of the CQ such that only the selected DSMS executes the CQ on data in the windowed portion 120A of the data stream 120.

Figure 13:
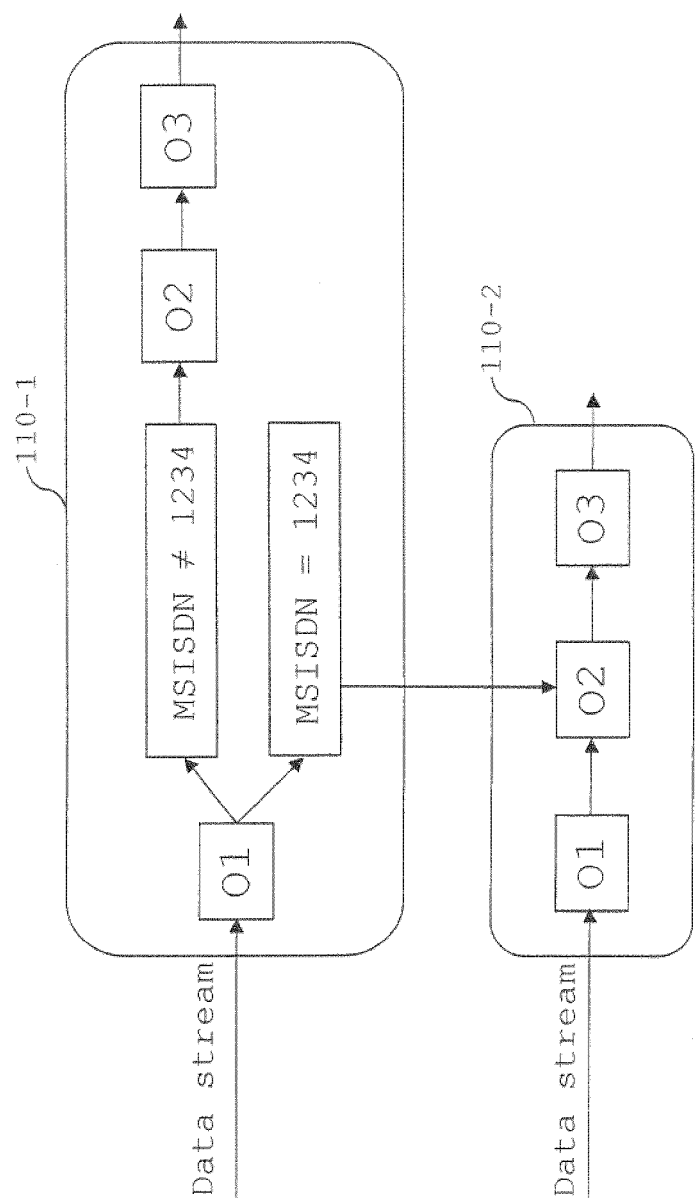
FIG. 13 is a block diagram illustrating the configuration of the query plan of a DSMS to include a forwarding process that forwards received data to another DSMS.
Figure 14:
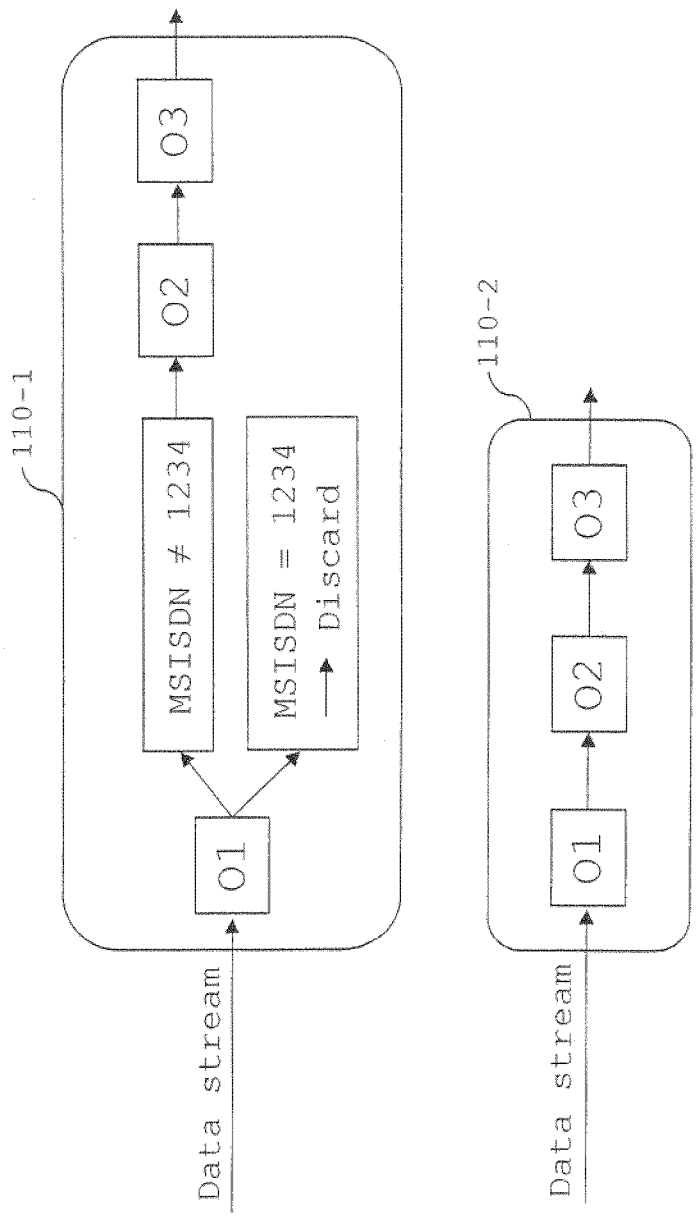
FIG. 14 is a block diagram illustrating a modification of the DSMS configuration shown in FIG. 13.

FIGS. 13 and 14 illustrate examples of such modified versions of the originally received CQ. In these example, the CQs finally configured in DSMSs 110-1 and 110-2 each comprise a filter/forwarding operator O1 and a set of query operators, O2 and O3, that make up the CQ to be executed (configured according to the original CQ received e.g. by the controller 140) so as to generate the corresponding output data stream requested by said original CQ by only one DSMS (DSMS 110-2 in the example) or, in other words, so as to achieve that the CQ for a data stream that can be received by a plurality of DSMSs is executed only by a selected DSMS (DSMS 110-2).

Where the specified QoS demands no data loss, for example, the control signal generator 146 may (subject to availability of the necessary bandwidth in stream data communication channel 150) generate a control signal to cause at least one of the identified DSMSs other than the selected DSMS to forward the data from the windowed portion 120A of the data stream 120 received thereby to the selected DSMS. This scenario is schematically illustrated in FIG. 13, which shows the reception and processing of the data stream 120 shown in FIG. 9, from a mobile data source identified by MSISDN "1234", by DSSMSs 110-1 and 110-2.

In this example, DSMS 110-2 is determined by the DSMS selector 144 (in step S32) to receive the larger part 120A-2 of the data stream portion 120A, as has been described above. Furthermore, based on the QoS requirement that no data loss can be accepted (acquired by the QoS acquisition module 145 in step S33), the control signal generator 146 configures the identified DSMSs 110-1 and 110-2 with query plans as illustrated in FIG. 13, so that DSMS 110-1 forwards the part 120A-1 of the data stream that it receives to DSMS 110-2 via the stream data communication channel 150. As shown in FIG. 13, the query plan in DSMS 110-1 includes a forwarding process that forwards received data from the windowed portion 120A to the selected DSMS 110-2 for processing. DSMS 110-2 is therefore configured to be the only one of the DSMSs 110-1 to 110-N to execute the CQ, on all of the data in the windowed portion 120A.

However, it might be the case that the number of data streams whose reception changes from one DSMS to another in is so high that the bandwidth threshold for the stream data communication channel 150 might be exceeded. If this situation arises, then it is preferable that no forwarding of data should occur, as illustrated in FIG. 14. As shown in FIG. 14, DSMS 110-1 is configured to execute a filtering process that causes it to discard the data it receives from the mobile device with MSISDN "1234", while DSMS 110-2 is configured to process the part 120A-2 of the windowed portion 120A of the data stream 120 which it receives from the mobile device, as well as the remainder of the data stream while the data stream is being received by DSMS 110-2.

In case the query involves not a single mobile device but a group of mobile devices (e.g. the CQ aims at obtaining the number of calls place by the "gold" subscribers in the upcoming 2 hours) then the procedure will be similar to the one described above. In this case, based on the time window length and the motion patterns, a fraction of the mobile devices located in certain locations are predicted to have the reception of their data streams change from one DSMS to another with a probability (P). Depending on the QoS figures of the issued CQ and on P, it should be assessed which DSMS would fit the requirements. If several DSMSs fit the requirements, then the one that grants more computing resources to upcoming CQs should be preferred. Preferably, every mobile device should be tied to a specific motion pattern (at least with some confidence), and this information should be stored in a database accessible by the controller 140. However, in some cases, this would be a rather complex task. A simpler option would provide the set of motion patterns with different weights or probabilities (e.g. mobile devices located in region "A" that change to region "B" within a time window of 10 minutes with a probability of 70%). Based on this information and on the actual user situation (that must also be accessible by the controller 140) the query plan adaptations can be performed.

[Modifications and Variations]

Many modifications and variations can be made to the embodiments described above.

For example, in the embodiments described above, the communications module 141, reception predictor 142, DSMS selector 144, QoS acquisition 145 and the control signal generator 146 of the controller 140 are each provided in the form of a programmable processing apparatus 200 having a processor 220 which provides the respective functions of these components by executing appropriate software instructions stored in instructions store 240. However, it will be appreciated that some or all of the aforementioned components may be implemented in dedicated hardware, e.g. FPGA or firmware.

Furthermore, it will be appreciated that the ordering of the steps that are performed by the various components of the controller 140 may differ from that described in the above embodiment. For example, in the process illustrated in FIG. 10, step S10 may be performed after or concurrently with step S20. Similarly, in FIG. 11, step S21 may be performed after or concurrently with step S22. Furthermore, step S33 in FIG. 12 may, in general, be performed at any stage prior to the selection in step S34.

The reception predictor 142 may predict how the identity of the DSMS receiving the data stream 120 will change based on the monitored movement in a different way to that described in the above embodiment. For example, the reception predictor 142 may alternatively calculate the expected trajectory of the mobile device based on the monitored movement, and use the calculated trajectory together with a map of the coverage areas of the DSMSs to determine the change in receiving DSMS.

Moreover, although the prediction in step S20 of the above embodiment is based on the monitored movement of a mobile device, the reception predictor 143 may alternatively be configured to predict how the identity of the DSMS receiving the data stream will change in a different way.

For example, the data store 143 of the reception predictor 142 may be arranged to store a log of how the identity of the DSMS receiving the data stream 120 changed over time (for example, time of day) in prior receptions of the data stream 120 by the DSMSs, and the reception predictor 142 may be arranged to predict how the identity of the DSMS receiving the data stream 120 will change by using the stored log.

In this alternative embodiment, the reception predictor 142 preferably monitors the data reception activities of the DSMSs and logs how the reception of the data stream 120 by the DSMSs changes over time. The DSMSs may allow the reception predictor 142 to monitor their data reception activities by sending it notifications comprising identifiers of the DSMSs receiving the data stream, and optionally a data stream identifier in cases where more than one switching data stream is being received by the DSPS 100.

The reception predictor 142 correlates monitored reception characteristics (i.e. the changes in the receiving DSMS identity with time) to establish whether they follow a reproducible switch pattern. In this way, the reception predictor may, for example, determine that reception of the data 120A changes from DSMS 110-1 to DSMS 110-2 at certain times of day. If the reception predictor 142 determines that the reception characteristics follow such a switch pattern, it stores the logged switch pattern in the data store 143. Once this pattern learning process has been completed and a switch pattern has been stored by the reception predictor 142, the reception predictor 142 is able to predict how the identity of the DSMS receiving the data stream 120 will change.

In this modification of the above-described embodiment, the reception predictor 142 preferably performs the pattern learning process on an on-going basis, to ensure the accuracy of its predictions. The pattern learning process is, however, optional, and the reception predictor may alternatively be programmed with the necessary switch pattern(s) by the user, which may be updated when necessary.

Furthermore, it should be noted that the selection of the single DSMS in step S32 need not be based on the amounts of data from the windowed portion 120A that are predicted to be received by each of the DSMS identified in step S31 but may instead be based on other criteria, for example the order in which the identified DSMSs are to receive the stream data. Thus, in an alternative embodiment, the DSMS selector 144 may determine an order in which the identified DSMSs are to receive the data in the windowed portion 120A of the data stream 120 in a modified step S32 and, in a modified step S34, select the single DSMS from among the identified DSMSs based on the determined order and the QoS value, among the other parameters mentioned above. This alternative embodiment would be advantageous where, for example, data loss associated with the switch in reception from one DSMS to another adversely impacts on the accuracy of the CQ result generated DSMS server that is to receive the data stream after the switch in reception occurs. It might then be preferable for the first DSMS to receive the data that is to be processed as a windowed portion to process the data received by that first DSMS, and for the remaining DSMSs to receive data from the windowed portion to discard the received data, or forward it to the first DSMS (if the associated delays over the stream data communication channel 150 determined by the controller 140 to be acceptable).

The invention claimed is:

1. A controller for controlling the processing of an input data stream by a data stream processing system comprising a plurality of data stream management systems, DSMSs, each DSMS being configured to execute a respective continuous query comprising an operator arranged to operate on windowed portions of the input data stream to generate an output data stream comprising continuous query execution results, the input data stream associated with a mobile communication device, the controller being configured to control the execution of the continuous query on a windowed portion of the input data stream when different DSMSs receive different parts of the data for the windowed portion, the controller configured to:
    monitor movement of the mobile communication device;
    store, at a data store, at least one motion pattern, each in association with respective indications of how the identity of the DSMS receiving the input data stream changed as the mobile communication device followed the at least one motion pattern;
    compare the monitored movement with the at least one stored motion pattern, select a motion pattern from the at least one stored motion pattern based on the comparison, and predict how the identity of the DSMS receiving the input data stream will change based on the indications associated with the selected motion pattern;
    select, for processing of the windowed portion of the input data stream, based on the prediction and a size of a window used to obtain the windowed portion of the input data stream, a single DSMS of the plurality of DSMSs that is to execute the respective continuous query, the windowed portion being data from the input data stream received during a time interval defined by the size of the window and for which the output data stream is expected, the output data stream being based on the data of the windowed portion; and
    generate a control signal to cause only the selected DSMS to execute the continuous query using data in the input data stream received thereby, so that the continuous query is executed on data in the windowed portion of the input data stream only by the selected DSMS.

2. The controller of claim 1, wherein the controller is further configured to:
    identify, based on the prediction and the size of the window used to obtain the windowed portion of the data stream, DSMSs that are to receive the data to be processed as the windowed portion of the data stream;
    determine the respective amount of data in the windowed portion of the data stream that is to be received by each of the identified DSMSs; and
    select the single DSMS from among the identified DSMSs based on the determined amounts of data.

3. The controller claim 1, wherein the controller is further configured to:
    identify, based on the prediction and the size of the window used to obtain the windowed portion of the data stream, DSMSs that are to receive the data to be processed as the windowed portion of the data stream;
    determine an order in which the identified DSMSs are to receive the data in the windowed portion of the data stream; and
    select the single DSMS from among the identified DSMSs based on the determined order.

4. The controller of claim 2, wherein the controller is further configured to:
    acquire a Quality of Service, QoS, value stipulating a QoS to be achieved during execution of the continuous query in respect to the output data stream comprising the execution results of the continuous query; and
    select, as the single DSMS that is to execute the continuous query, a DSMS of the identified DSMSs that is capable of executing the continuous query on the data in the windowed portion of the data stream such that the data stream processing system provides at least the QoS stipulated by the QoS value.

5. The controller of claim 1, wherein the controller is further configured to monitor data processing workloads of at least a set of the DSMSs, and select the single DSMS based on the monitored data processing workloads.

6. The controller of claim 1, wherein the controller is further configured to:
    identify, based on the prediction and the size of the window used to obtain the windowed portion of the input data stream, DSMSs that are to receive data in the input data stream to be processed as the windowed portion; and
    generate a control signal comprising instructions to configure each of the identified DSMSs with respective continuous queries such that only the selected DSMS executes the continuous query on the data in the windowed portion of the input data stream.

7. The controller of claim 1, wherein the controller is further configured to:
    identify, based on the prediction and the size of the window used to obtain the windowed portion of the input data stream, DSMSs that are to receive the data to be processed as the windowed portion of the input data stream; and
    generate a control signal to cause at least one of the identified DSMSs other than the selected DSMS to forward the data from the windowed portion of the input data stream received thereby to the selected DSMS.

8. The controller of claim 6, wherein the controller is configured to generate a control signal comprising instructions to configure at least one of the identified DSMSs other than the selected DSMS with respective continuous queries each implementing a forwarding process that forwards received data from the windowed portion of the input data stream to the selected DSMS for processing.

9. A data stream processing system comprising:
a plurality of data stream management systems, DSMSs, each DSMS being configured to execute a respective continuous query comprising an operator arranged to operate on windowed portions of an input data stream to generate an output data stream comprising continuous query execution results, the input data stream associated with a mobile communication device, and during reception of data in the input data stream to be processed as a windowed portion, the DSMS receiving the input data stream changes; and
a controller configured to:
  monitor movement of the mobile communication device;
  store, at a data store, at least one motion pattern, each in association with respective indications of how the identity of the DSMS receiving the input data stream changed as the mobile communication device followed the at least one motion pattern;
  compare the monitored movement with the at least one stored motion pattern, select a motion pattern from the at least one stored motion pattern based on the comparison, and predict how the identity of the DSMS receiving the input data stream will change based on the indications associated with the selected motion pattern;
  select, for processing of the windowed portion of the input data stream, based on the prediction and a size of a window used to obtain the windowed portion of the input data stream, a single DSMS of the plurality of DSMSs that is to execute the respective continuous query, the windowed portion being the data from the input data stream received during a time interval defined by the size of the window and for which the output data stream is expected, the output data stream being based on the data of the windowed portion; and
  generate a control signal to cause only the selected DSMS to execute the continuous query using data in the input data stream received thereby, so that the continuous query is executed on the data in the windowed portion of the input data stream only by the selected DSMS.

10. The controller of claim 1, wherein the controller is included in a data stream management system apparatus.

11. A method of controlling the processing of an input data stream by a data stream processing system comprising a plurality of data stream management systems, DSMSs, each DSMS being configured to execute a respective continuous query comprising an operator arranged to operate on windowed portions of the input data stream to generate an output data stream comprising continuous query execution results, the input data stream associated with a mobile communication device, and during reception of data to be processed as a windowed portion of the input data stream, the DSMS receiving the input data stream changes, the method comprising:
  determining a size of a window to be used to obtain the windowed portion of the input data stream;
  monitoring movement of the mobile communication device;
  storing, at a data store, at least one motion pattern, each in association with respective indications of how the identity of the DSMS receiving the input data stream changed as the mobile communication device followed the at least one motion pattern;
  comparing the monitored movement with the at least one stored motion pattern, selecting a motion pattern from the at least one stored motion pattern based on the comparison, and predicting how the identity of the DSMS receiving the input data stream will change based on the indications associated with the selected motion pattern;
  selecting, for processing of the windowed portion of the input data stream, based on the prediction and the determined window size, a single DSMS of the plurality of DSMSs that is to execute the respective continuous query, the windowed portion being the data from the input data stream received during a time interval defined by the size of the window and for which the output data stream is expected, the output data stream being based on the data of the windowed portion; and
  generating a control signal to cause only the selected DSMS to execute the continuous query using data in the input data stream received thereby, so that the continuous query is executed on the data in the windowed portion of the data stream only by the selected DSMS.

12. The method according to of claim 11, wherein the single DSMS is selected by:
  identifying, based on the prediction and the determined window size, DSMSs that are to receive data in the input data stream to be processed as the windowed portion;
  determining the respective amount of data in the windowed portion of the input data stream that is to be received by each of the identified DSMSs; and
  selecting the single DSMS from among the identified DSMSs based on the determined amounts of data.

13. The method of claim 11, wherein the single DSMS is selected by:
  identifying, based on the prediction and the determined window size, DSMSs that are to receive data in the input data stream to be processed as the windowed portion;
  determining an order in which the identified DSMSs are to receive data in the windowed portion of the input data stream; and
  selecting the single DSMS from among the identified DSMSs based on the determined order.

14. The method of claim 12, further comprising:
  acquiring a Quality of Service, QoS, value stipulating a QoS to be achieved during execution of the continuous query in respect to the output data stream comprising the execution results of the continuous query; and
  selecting, as the single DSMS that is to execute the continuous query, a DSMS of the identified DSMSs that is capable of executing the continuous query on the data in the windowed portion of the input data stream such that the data stream processing system provides at least the QoS stipulated by the QoS value.

15. The method of claim 11, further comprising:
  identifying, based on the prediction and the determined window size, DSMSs that are to receive the data in the input data stream to be processed as the windowed portion,
  wherein the generated control signal comprises instructions to configure each of the identified DSMSs with respective continuous queries such that only the selected DSMS executes the continuous query on the data in the windowed portion of the input data stream.

16. The method of claim 11, further comprising:
identifying, based on the prediction and the determined window size, DSMSs that are to receive the data in the input data stream to be processed as the windowed portion; and
generating a control signal to cause at least one of the identified DSMSs other than the selected DSMS to forward the data from the windowed portion of the input data stream received thereby to the selected DSMS.

17. The method of claim 15, wherein the generated control signal comprises instructions to configure at least one of the identified DSMSs other than the selected DSMS with respective continuous queries each implementing a forwarding process that forwards received data from the windowed portion of the input data stream to the selected DSMS for processing.

18. A non-transitory computer-readable storage medium storing computer program instructions which, when executed by a processor, cause the processor to perform a method of controlling the processing of an input data stream by a data stream processing system comprising a plurality of data stream management systems, DSMS, each DSMS being configured to execute a respective continuous query comprising an operator arranged to operate on windowed portions of the input data stream to generate an output data stream comprising continuous query execution results, the input data stream associated with a mobile communication device, and during reception of data to be processed as a windowed portion of the input data stream, the DSMS receiving the input data stream changes, the method comprising:
determining a size of a window to be used to obtain the windowed portion of the input data stream;
monitoring movement of the mobile communication device;
storing, at a data store, at least one motion pattern, each in association with respective indications of how the identity of the DSMS receiving the input data stream changed as the mobile communication device followed the at least one motion pattern;
comparing the monitored movement with the at least one stored motion pattern, selecting a motion pattern from the at least one stored motion pattern based on the comparison, and predicting how the identity of the DSMS receiving the input data stream will change based on the indications associated with the selected motion pattern;
selecting, for processing of the windowed portion of the input data stream, based on the prediction and the determined window size, a single DSMS of the plurality of DSMSs that is to execute the respective continuous query, the windowed portion being the data from the input data stream received during a time interval defined by the size of the window and for which the output data stream is expected, the output data stream being based on the data of the windowed portion; and
generating a control signal to cause only the selected DSMS to execute the continuous query using data in the input data stream received thereby, so that the continuous query is executed on the data in the windowed portion of the input data stream only by the selected DSMS.

* * * * *